Sept. 27, 1927.

E. HELOIAN

DISH STAND

Filed Oct. 7, 1926

1,643,450

Inventor
Ernest Heloian,

By Clarence A. O'Brien
Attorney

Patented Sept. 27, 1927.

1,643,450

UNITED STATES PATENT OFFICE.

ERNEST HELOIAN, OF HIGHLAND PARK, MICHIGAN.

DISH STAND.

Application filed October 7, 1926. Serial No. 140,108.

This invention relates to new and useful improvements in stands and has for its primary object to provide an article of this character that is especially adapted for use in the support of a dish, the same being so constructed in order that the dish may be moved from place to place upon a table or counter without any great liability of spilling the contents thereof.

The invention is primarily adapted for use in the supports of dishes, condiment holders, knives, forks, et cetera, in order that such articles may be pushed from place to place upon a table so as to overcome the requirement of the same being personally handed to the different parties at the table.

A further and important object resides in the provision of a stand of this character that is extremely simple in construction, inexpensive of manufacture and one that will not only prove highly ornamental but will be well adapted for all of the purposes intended.

Other objects will become apparent as the nature of the invention is better understood, the same comprising the novel form, combination, and arrangement of parts hereinafter more fully described, shown in the accompanying drawing and claimed.

Figure 1:
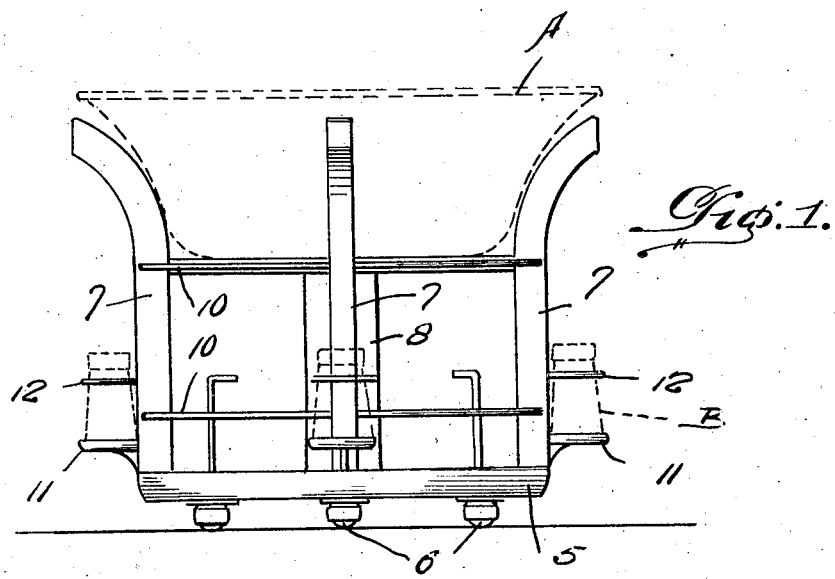
Figure 2:
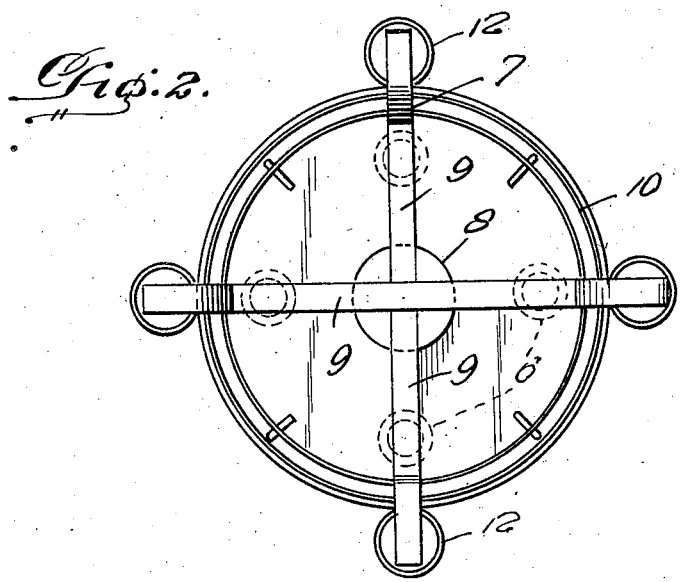

In the accompanying drawing wherein like numerals indicate like parts:

Figure 1 is a side elevation of a stand constructed in accordance with the present invention, a dish as well as several condiment holders being disclosed in dotted lines as being supported thereby and Fig. 2 is a top plan view of the stand per se.

Now having particular reference to the drawing my novel stand constitutes the provision of a circular base 5 upon the under side of which are a plurality of supporting roller casters 6, preferably four in number, the same being provided so that the stand may be pushed from place to place in an easy manner. Arising from this base 5 at equally spaced points from the edge thereof are vertical legs 7, preferably four in number, the upper ends of which are flared outwardly as is clearly indicated in Fig. 1 in order that a dish A may be supported therebetween.

Arising from the center of the base 5 is a circular post 8 that terminates slightly beneath the point of convergence of the legs 7 and upon the top surface of which are a pair of cross bars 9—9 suitably secured to the post and to each other at their centers, the outer ends thereof being secured to the legs 7 in any desirable manner.

Interconnecting all of the legs 7 in tightly spaced relation with respect to the base 5 and at the cross bars 9—9 are pairs of concentric wire rings 10—10 that serve to maintain the legs 7—7 in proper perpendicular relation with respect to the base 5 and also provide means whereby knives and forks or the like may be supported vertically between the legs, this by inserting the said articles between the inner and outer wire rings as is obvious.

Upon the outer side of each leg 7 adjacent the lower end thereof is a condiment holder supporting plate 11 while directly thereabove is a wire ring 12 for engagement all around the neck of the holder all of which are indicated by the reference characters B, so as to prevent the same from falling from said plate.

It will be thus seen that I have provided a highly novel, simple and efficient form of stand that is well adapted for all of the purposes heretofore designated. Even though I have herein shown and described the invention as consisting of certain details of construction it is nevertheless to be understood that some changes may be made in the invention without affecting the spirit and scope of the appended claim.

Having thus described my invention what I claim as new and desire to secure by Letters Patent is:

In a stand of the character described, a base plate, vertical legs extending from the edge of the base plate at spaced points thereon, cross bars interconnecting the legs adjacent the upper ends thereof and provided for supporting a receptacle between the upper ends of said legs, and spaced concentric wire rings interconnecting all of the legs at spaced vertical points, and between which knives or forks or the like may be supported, said upper ends of the legs being curved outwardly and upwardly.

In testimony whereof I affix my signature.

ERNEST HELOIAN.